United States Patent

Moses et al.

[11] Patent Number: 6,108,788
[45] Date of Patent: Aug. 22, 2000

[54] CERTIFICATE MANAGEMENT SYSTEM AND METHOD FOR A COMMUNICATION SECURITY SYSTEM

[75] Inventors: Timothy Moses, Kanata; Ronald Vandergeest, Ontario, both of Canada

[73] Assignee: Entrust Technologies Limited, Ottawa, Canada

[21] Appl. No.: 08/986,653

[22] Filed: Dec. 8, 1997

[51] Int. Cl.[7] .................................................. H04L 9/32
[52] U.S. Cl. ............................................................ 713/201
[58] Field of Search .................................. 713/200, 201; 380/21, 23, 25, 28, 30, 49

[56] References Cited

U.S. PATENT DOCUMENTS

| | | | |
|---|---|---|---|
| 5,218,637 | 6/1993 | Angebaud et al. | 380/23 |
| 5,450,493 | 9/1995 | Maher | 380/30 |
| 5,515,439 | 5/1996 | Bantz et al. | 380/23 |
| 5,668,877 | 9/1997 | Aziz | 380/30 |
| 5,787,172 | 7/1998 | Arnold | 380/21 |
| 5,841,865 | 11/1998 | Sudia | 380/21 |

*Primary Examiner*—Thomas M. Heckler
*Attorney, Agent, or Firm*—Markison & Reckamp, P.C.

[57] ABSTRACT

A certificate management system and method allows a requester, such as a subscriber using a software application, to customize certificates by selecting variable certificate content specification data. A certificate issuing unit, such as a certification authority issues a variable content based certificate in response to the requester based variable certificate content specification data, after the variable certificate content specification data has been compared with issuance criteria data to ensure that the requested certificate customization parameters do not conflict with security system constraints, such as security limits. The issuance criteria data is configurable by a security officer or other user through the certificate issuing unit. If desired, each differing software application (i.e., requester) may have its own customized certificates allowing greater flexibility for the security system and for the requesters.

38 Claims, 6 Drawing Sheets

CERTIFICATE MANAGEMENT SYSTEM AND METHOD FOR A COMMUNICATION SECURITY SYSTEM

CROSS-REFERENCE TO RELATED APPLICATION

A related co-pending application entitled "A Computer Network Security System and Method Having Enforceable Security Policy Provision" having Ser. No. 08/986,457 has been filed on even date and is owned by instant assignee.

BACKGROUND OF THE INVENTION

The invention relates generally to computer security systems employing cryptographic techniques to secure information, and more particularly to computer network security systems using cryptographic techniques that employ certificates.

In typical public key cryptography systems, digital signature key pairs, such as a private key and public key, are used to authenticate a digital signature of a subscriber using a software application in order to confirm the identity of the sender of the message. A subscriber may generally be for example a network computer node, a software application or user in the security system. In addition to digital signature key pairs, encryption key pairs are also generally used to encrypt the data being sent from one subscriber to another subscriber within the computer network. Certificates are generated by a manager server or a trusted certification authority for the public keys of the private/public key pair to certify that the keys are genuinely owned by a named subscriber. Standards, such as ISO 9594-8 available from the International Organization for standardization define typical certificate content.

Generally, each subscriber stores a certification authority public key to verify that the manager server issued the certificate. A public key certificate typically includes a user public key which is bound by the signature of the certification authority to the subscriber name and public key and other data including expiry data indicating the expiration date or period for the public key certificate. Each sender (subscriber) has a copy of its own certificate. To send an encrypted message, a sender may access a directory, such as an onboard client cache memory or other certificate storage medium to get a copy of an encryption certificate for a specified receiver. For a certificate to be considered valid, the digital signature must be valid and there must be no existing revocation of the certificate by the certification authority.

The public keys and certificates are used primarily for two main purposes: verifying a digital signature and encrypting information. The receiver of a digitally signed E-mail or document for example, uses the public key in the sender's certificate to verify the digital signature of the sender. A receiver validates the digital signature by reference to the received certificate.

In conventional cryptography based computer systems, the certification authority, referred to herein as the certificate issuing unit, typically issues one style of certificates that is the same for every subscriber and software application on the node. In such systems, the certificate contains conventional information. For example, such systems may issue a single style certificate that includes the public key information such as an encryption public key or signing public key, a user name, a certification authority signature based on the certification authority private key, and expiry period data of the certificate. However a problem arises with such systems because the certificate content is inflexible. For example, if a particular software application requires different privileges or higher security, the certificate issuing unit can only generate a standard certificate, irrespective of the differing requirements of the applications or the subscriber.

Other certificate management systems are known which afford some coarse level of certificate flexibility by generating a fixed number of predefined types of certificates. For example, a subscriber may request one type of certificate (type A) and may request another type of certificate (type B) for a different application, however, such systems do not typically offer flexibility within the certificates. Therefore, every type A certificate has the same type of data and every type B certificate has the same type of data.

Other certificate management systems are known which require an out of band communication where a certification authority creates a database in advance of subscribers connecting to the system, so that when a subscriber requests a certificate, the certification authority pulls an a priori defined and stored certificate for a selected subscriber. As with other certificate management systems, such systems typically do not offer flexibility within the certificates to allow a subscriber or application to specify flexible certificate content on an as-needed basis. As a result, limited flexibility is utilized throughout the security system and more efficient use of application or client capabilities are prevented.

In addition, some cryptography based security systems may utilize multiple certification authorities so that the subscriber may get certificates from two different certification authorities. In such systems, one certification authority may have a lower security quality level then the other. A problem arises if the multiple certificates contain the same information and the client cannot determine whether or not one certificate has a different security quality than another. Therefore it would be desirable to have a certificate security system that could validate variable certificates to determine which certificate may be appropriate based on different security quality or other certificate issuance criteria.

Consequently there exists a need for a certificate management system and method to allow a requesting application or subscriber to customize a certificate to more closely meet its needs, but within constraints imposed by the certification authority to maintain adequate security within the system. Such a certificate management system and method should facilitate variable certificate content specification by a subscriber and also issue variable content based certificates to facilitate customization of certificates within the system. A need also exists for a certificate management system and method that employs suitable validation of customized certificates to distinguish among differing certificate data.

DETAILED DESCRIPTION OF THE INVENTION

A certificate management system and method allows a requester, such as a subscriber, to customize certificates by selecting variable certificate content specification data. A certificate issuing unit, such as a certification authority issues a variable content based certificate in response to the requestor based variable certificate content specification data, after the variable certificate content specification data has been compared with issuance criteria data to ensure that the requested certificate customization parameters do not conflict with security system constraints, such as security limits. The issuance criteria data is configurable by a security officer or other user through the certificate issuing unit. If desired, each differing software application may have its own customized certificates allowing greater flexibility for the security system and for the requesters.

Figure 1:
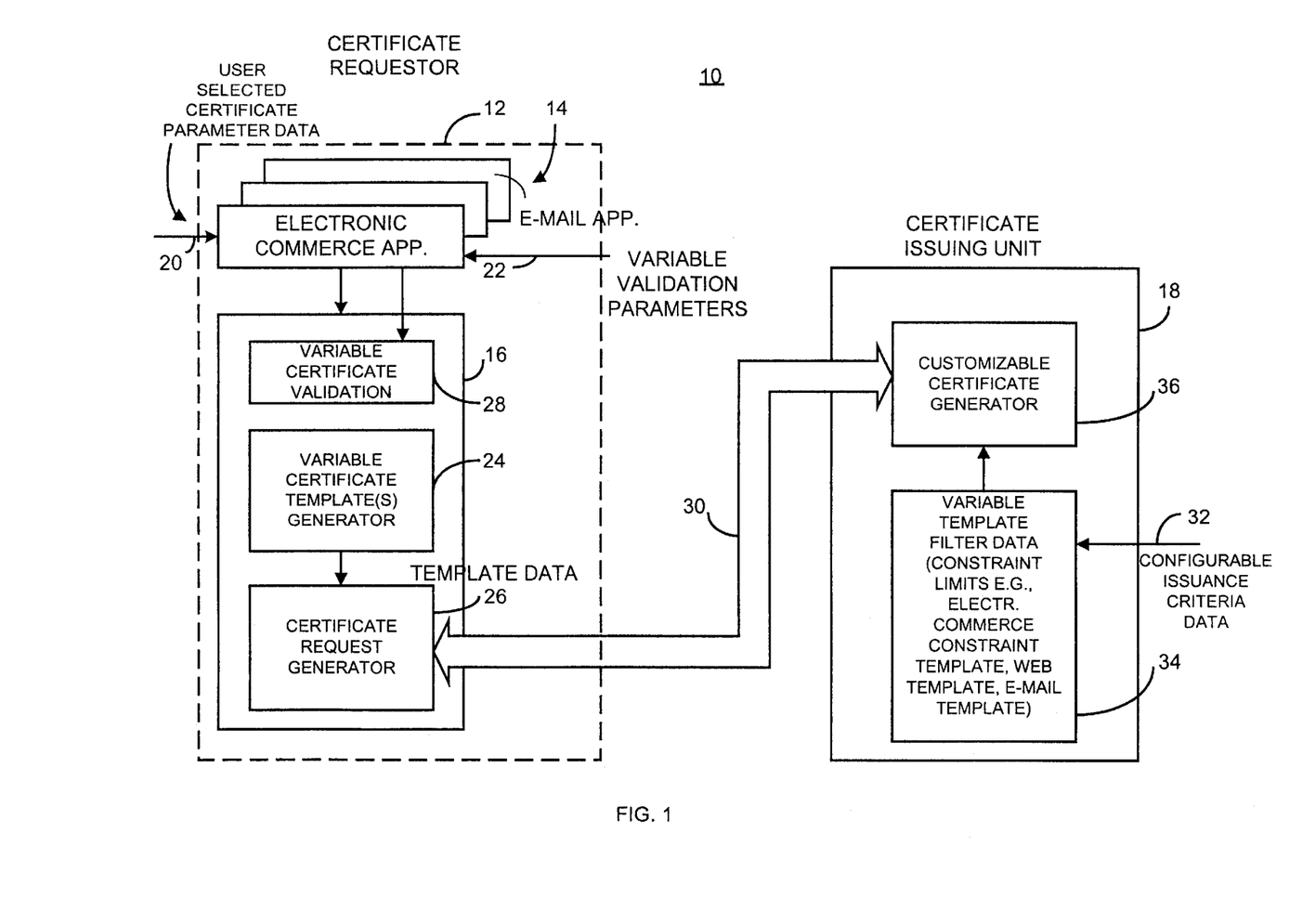
FIG. 1 a block diagram generally showing a certificate management system in accordance with one embodiment of the invention.

FIG. 1 shows a certificate management system 10 having a certificate requestor 12 such as a network node having a plurality of software application modules 14 and a software module in the network node configured as a certificate management module 16. The certificate management system 10 also includes a certificate issuing unit 18 such as a network server configured as a certification authority.

Each software application module 14 communicates with the certificate management module 16 through typical software communication techniques. One software application may be for example, an electronic commerce application that utilizes a common public key cryptography engine to encrypt financial documents and decrypt received documents from other subscribers within the security system. Other examples of software application modules 14 include E-mail applications which allow decryption of received E-mails or encryption of sent E-mails. The encryption engine, as known in the art, uses public key cryptography techniques, such as RSA based cryptography techniques using public and private key pairs. Each software application module 14 produces a graphical user interface to allow a user to select variable certificate parameters 20. The variable certificate parameters 20 are variable certificate content specification data, such as data representing desired certificate validity periods, public key usage requirements, system policy information, and other information as described later. If desired, the applications 14 may be configured to allow selection of variable validation parameters 22 which are used for purposes of validating issued customized certificates as issued from the certificate issuing unit 18.

The certificate management module 16 is preferably, but not limited to, an Application Program Interface (API) having a variable certificate template generator 24 for use in customizing certificates that are later issued from the certificate issuing unit 18. The variable certificate template generator 24 provides one or more variable certificate templates to facilitate a customization of security certificates issued by the certificate issuing unit 18. The certificate management module 16 facilitates requester based variable certificate content specification by allowing customization of certificates, and within certificates, as determined by a user or other source through the selected certificate parameters 20 and variable certificate templates.

The certificate management module 16 also includes a certificate request generator 26 which requests a variable content based certificate from the certificate issuing unit 18. The certificate management module 16 responds to the user selected certificate parameter data 20, which is variable certificate content specification data, to customize certificates through the variable certificate template. The certificate management module 16 also includes a variable certificate validation engine (software module) 28 which provides variable certificate validation of a certificate which has been issued to another subscriber. The variable certificate validation engine 28 receives the variable validation parameters 22 through the software applications 14 interfaces and uses the variable validation parameters as the basis for determining whether to validate an issued certificate from the certificate issuing unit 18 or other subscriber.

By providing the GUI interface for facilitating user selected certificate parameters for each software application, the certificate management module 16 facilitates requestor based variable certificate content specification data for selection of certificate content for the plurality of application modules 14 utilizing different certificate content specification data 20 for each application 14 if desired.

The certificate request generator 26 transmits template data for the variable certificate template from the template generator 24 to the certificate issuing unit 18 to facilitate customization of security certificates. Preferably, the certificate request generator 26 sends a variable certificate request to the certificate issuing unit 18 through a secure communication link 30 and also sends the variable certificate template data along with certificate option data. The certificate option data informs the certificate issuing unit 18 how to process the certificate request. For example, it may indicate that the resulting certificate should be published or, that the certificate issuing unit 18 should generate the key pair and back-up the private key component.

The certificate issuing unit 18 also includes a graphical user interface for allowing selection of configurable issuance criteria data 32 which sets limits on which data can be customized by the requestor and how the data may be customized. The configurable issuance criteria data 32 allows the security system to maintain a desired level of security depending upon the type of software application seeking the variable certificate and the desired security policies as determined by a security officer or other management source. Put another way, the configurable issuance criteria data 32 serves as filter data for the variable template data communicated by the certificate management module 16 to the certificate issuing unit 18. The configurable issuance criteria data 32 is stored in memory 34 of the certificate issuing unit 18. Certificate issuing unit I 8 includes a customizable certificate generator 36 which analyzes requester based variable certificate content specification data (template data) to determine whether the variable content based certificate as desired by the certificate management module 16 or requestor is in conformance with the configurable issuance criteria data 32. In addition, the customizable certificate generator 36 fills in blanks of the variable certificate template customized by the requestor if required data is not filled in by the requestor. The customizable certificate generator 36 is preferably a software program that controls a network server to carry out the processes as described herein.

The customizable certificate generator 36 generates a variable content based certificate template based on the requester based variable certificate content specification data and the configurable issuance criteria data. The variable content based certificate template that is generated then serves as the basis for generating a variable content based certificate, which is sent from the certificate issuing unit 18 to the certificate management module 16. In addition, the certificate issuing unit 18 transmits approval status to the certificate management module 16 indicating whether the requested customized certificate based on the template data was accepted by the certificate issuing unit 18. The certificate issuing unit 18 may approve all of the customized selections for the certificate and it may modify the content of the requested variable content based certificate if it determines that requests are in conflict with the constraint limits, i.e. the configurable issuance criteria data 32. In addition, the certificate issuing unit may reject the certificate request because the template data in the request would create an undesirable security condition for the system.

The software components of the certificate management system 10 are preferably stored on a storage medium for storing programming instructions that, when read by a processing unit, such as the node or manager server, causes either or both of the processing units to facilitate variable content based certificate processing as described herein. The storage medium may be a CD ROM, magnetic diskettes, digital tapes or any other suitable storage device for storing the requisite programming instructions.

Figure 2:
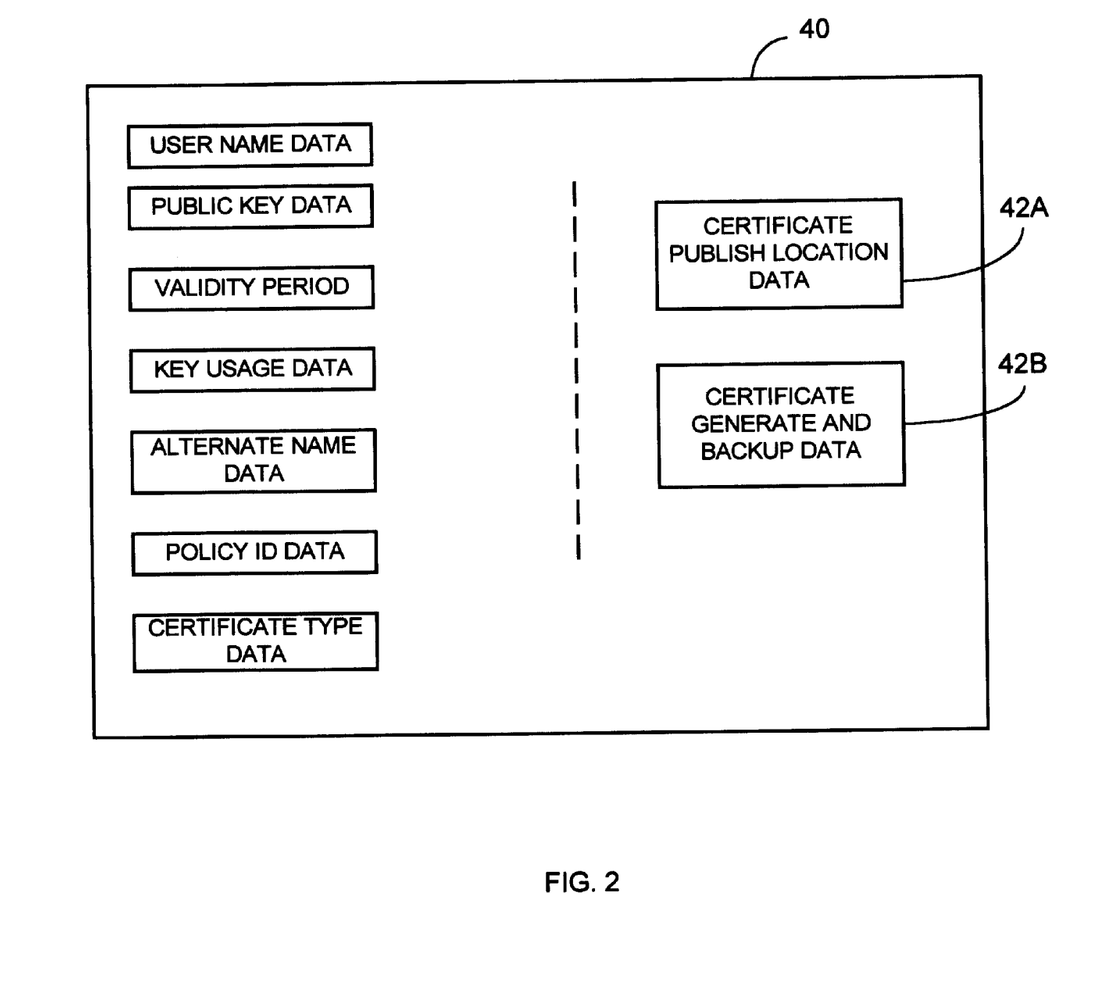
FIG. 2 is a block diagram generally depicting one example of a variable certificate template for use in accordance with one embodiment of the invention.

Referring to FIG. 2, user selected certificate parameter data 20, which serves as the variable certificate content specification data, is used to generate a customized certificate template 40 by the variable certificate template generator 24. Examples of template fields that represent the variable certificate content specification data include for example the name of a user, such as a department name, an individual's name or other subject identifier (such as a device identifier or process identifier) and public key definition data indicating the type of cryptography techniques that are authorized or used by a given application. For example public key data may indicate whether digital signature algorithms can be used or whether only encryption algorithms are used in the case where a particular user or software application does not utilize both encryption and digital signature cryptography techniques. Other variable certificate content specification data in the template 40 may include validity period data indicating a start date and end date of the certificate, key usage data, which one of the digital signature public key and encryption public key should be included in the certificate, and an alternate name identifier such as an E-mail address or other data that may be associated with the name of the subject.

In addition, policy rules of the system may be transferred to a subscriber through the certificate so that the client or requester may enforce the rules as determined by the certification authority or management entity. One example of customized certificate policy enforcement is described in co-pending application entitled "A Computer Network Security System and Method Having Enforceable Security Policy Provision" filed on even date and assigned to instant assignee. An example of certificate policy identifier data (a policy ID is an indication of the practices operated by and assurances offered by a certificate issuer) related to a policy certificate may include certificate data indicating the dollar amount of signatory authority by an associated user thereby imposing signature authority limits through the use of certificates. Other template data may include data representing a certificate type, namely whether a certificate is suitable for use in a particular business application.

The template 40 also preferably includes option data 42*a* and 42*b* which notifies the certificate issuing unit 18 how to handle the variable content based certificate if it is issued. For example, certificate option data 42*a* and 42*b* may include a byte or word representing whether the certificate issuing unit 18 should publish the certificate in a public directory or in some other directory. Another example of certificate option data may include data representing whether the certificate issuing unit 18 should generate the key pair and backup the corresponding private key at the certification authority for additional security. It will be recognized that the above template data is only an example and that any other suitable template data may also be communicated as part of the variable certificate request.

Figure 3:
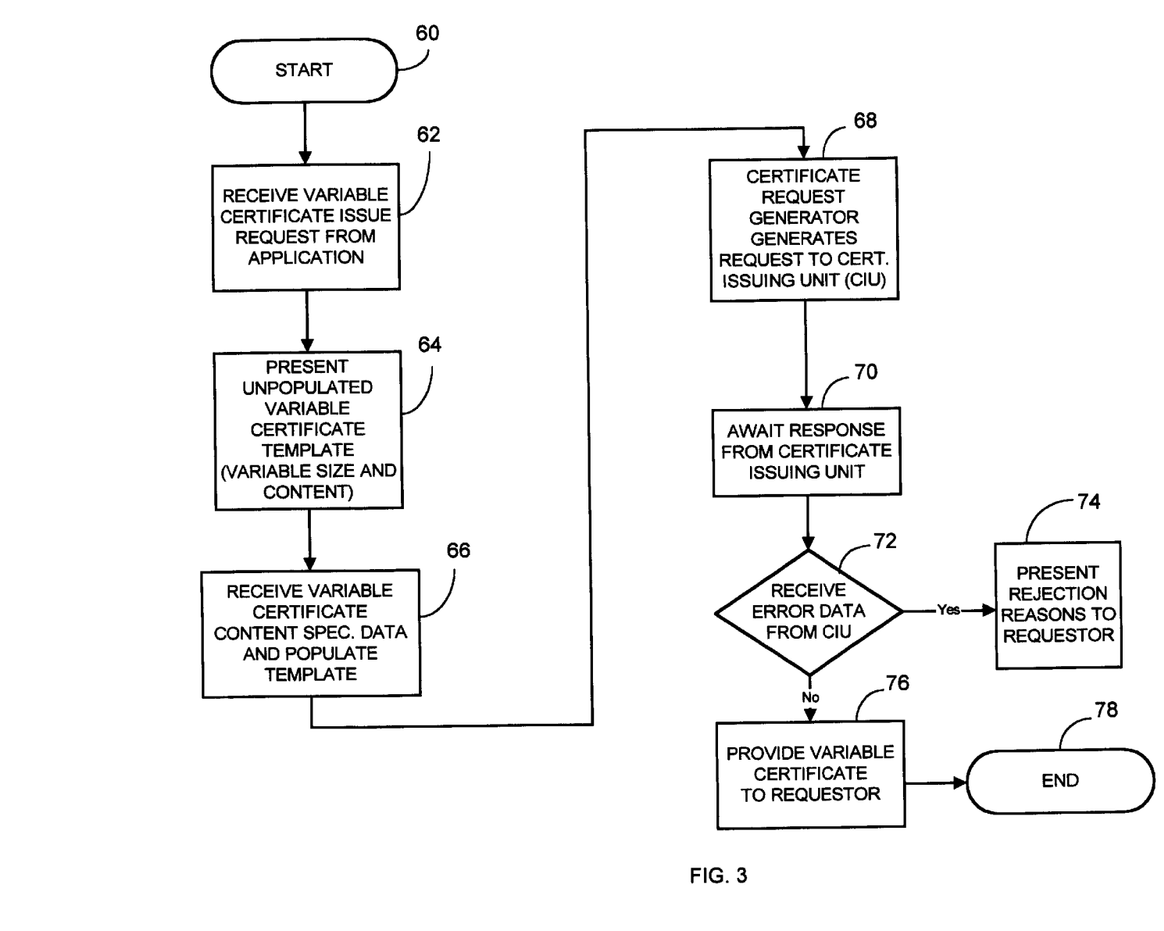
FIG. 3 is a flowchart generally depicting the operation of a requester for customizing variable certificates in accordance with one embodiment of the invention.

FIG. 3 shows one example of the operation of the certificate management module 16 which starts by waiting for communication from one of the plurality of applications 14 as shown in block 60. The certificate management module 16 receives a variable certificate issue request from the requester, namely any of the applications 14 as shown in block 62. The certificate management module 16 then presents an unpopulated variable certificate template to the user through the application 14 and graphic user interface as shown in block 64. The unpopulated variable certificate template varies in size and content depending on the application requesting the issuance of a variable certificate. For example the certificate management module preferably stores differing sized and differing content based unpopulated templates for an electronic commerce application compared to an E-mail application. However the initial unpopulated variable certificate templates also vary in size and content depending upon the input of the user and the selected certificate parameters that are entered.

The requestor then selects the variable certificate content by specifying which data is to be entered into the unpopulated variable certificate template. The certificate management module 16 receives the variable certificate data from the requester as shown in block 66 and populates the unpopulated variable certificate template using the variable certificate template generator 24. This may be done using standard database population techniques to populate unpopulated template fields. A resulting populated variable certificate template 40 is then temporarily stored by the certificate management module 16.

Upon population of the variable certificate template 40, or prior to completing population of the variable certificate template 40, the certificate request generator 26 generates a variable certificate request to the certificate issuing unit 18. Preferably the request includes the template data populated by the variable certificate template generator 24. This is shown in block 68. Along with the template data, the certificate request generator 26 also transfers the option data 40*a* and 40*b* to the certificate issuing unit 18. As shown in block 70, the certificate management module 16 then awaits response from the certificate issuing unit 18. As shown in block 72, if the certificate management module 16 receives error data from the certificate issuing unit 18, the certificate management module 16 presents rejection reasons to the requestor through the applications 14 as shown in block 72 and 74. If the certificate management module 16 does not receive error data from the certificate issuing unit 18 through the certificate request generator 26, the certificate management module 16 provides the customized certificate as issued by the issuing unit 18, to the requester as shown in block 76. The certificate management module 16 then awaits a new certificate generation request from the applications 14 as shown in block 78.

Figure 4:
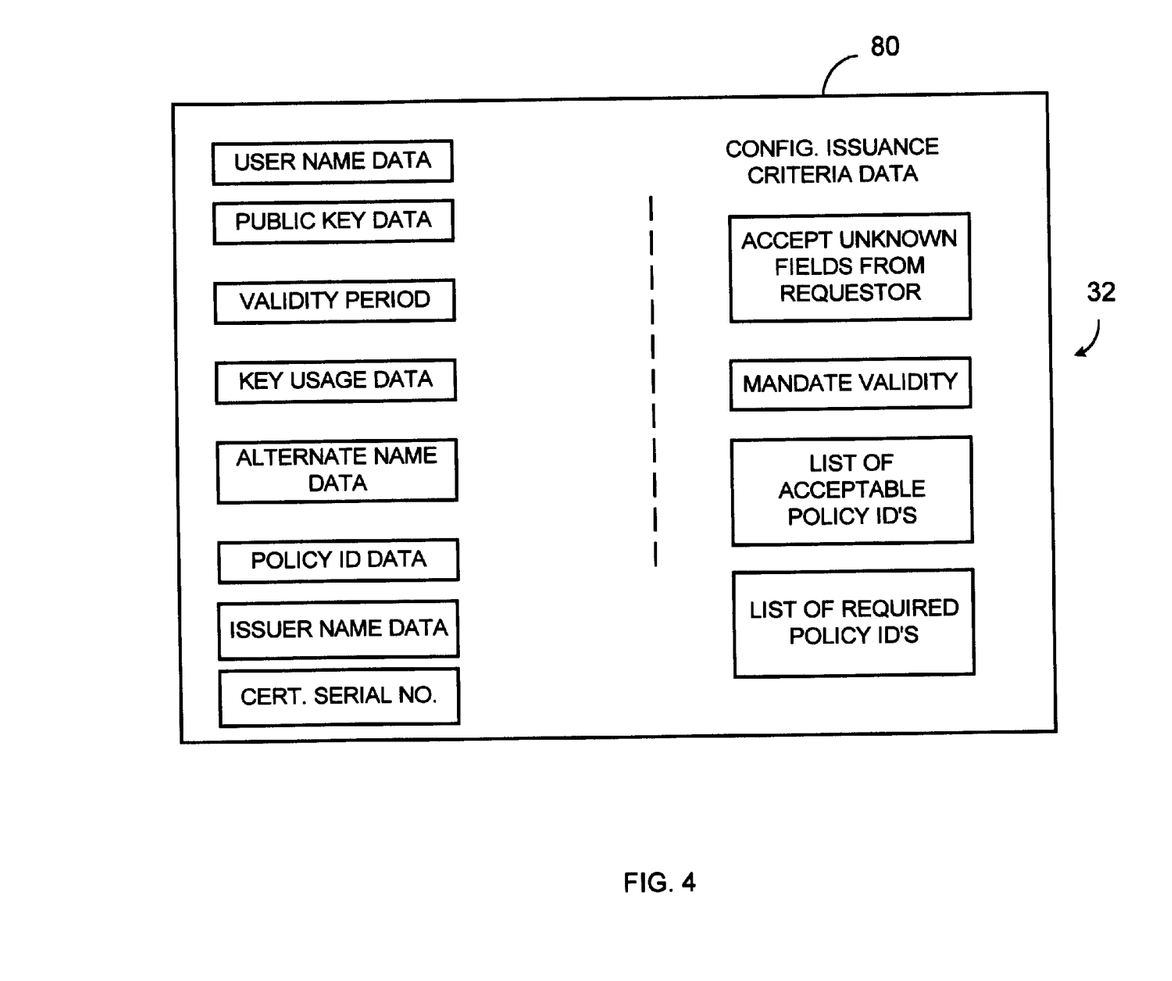
FIG. 4 is a block diagram generally depicting one example of a variable certificate template containing master customization data and configurable issuance criteria data used by a certificate issuing unit in accordance with one embodiment of the invention.

FIG. 4 shows an example of a variable certificate template 80 generated by the customizable certificate generator 36. The variable certificate template 80 includes variable certificate issuance criteria data. Additional data in the variable certificate template 80 includes an issuer field 82 which may be the name of the certificate issuing unit 18 along with a certificate serial number 84. Other data includes configurable issuance criteria data 32 which is preferably selected by a security officer through the graphical user interface. The configurable issuance criteria data 32 may be provided in template fields. The configurable issuance criteria data 32 includes, for example, data representing whether to accept unknown fields from the requester, whether to mandate that validation is carried out by a requester, a list of acceptable policy identifiers, a list of required policy identifiers, and any other suitable issuance criteria data which is used to determine whether a variable certificate should be issued and the constraints placed on the requester through the certificate. The variable certificate template 80 is preferably populated by allowing a security officer to enter this information through a graphical user interface. The configurable issuance criteria data which may include policy rule data as set forth in previously mentioned co-pending application entitled "A Computer Network Security System and Method Having Enforceable Security Policy Provision", such as the list of acceptable policy identifiers (I.D.s) and a list of required policy I.D.s, is analyzed based on a user name for example. Pre-stored data representing a set of required policies may be incorporated in the certificate issuing unit 18 such that certain user names are only authorized to request certain modifications to certificates. For example, validity period start and stop dates may be limited based on the user name data or certificate serial number or other information such that the certificate issuing unit 18 evaluates these constraint limits to determine whether the requested template data is proper.

Figure 5:
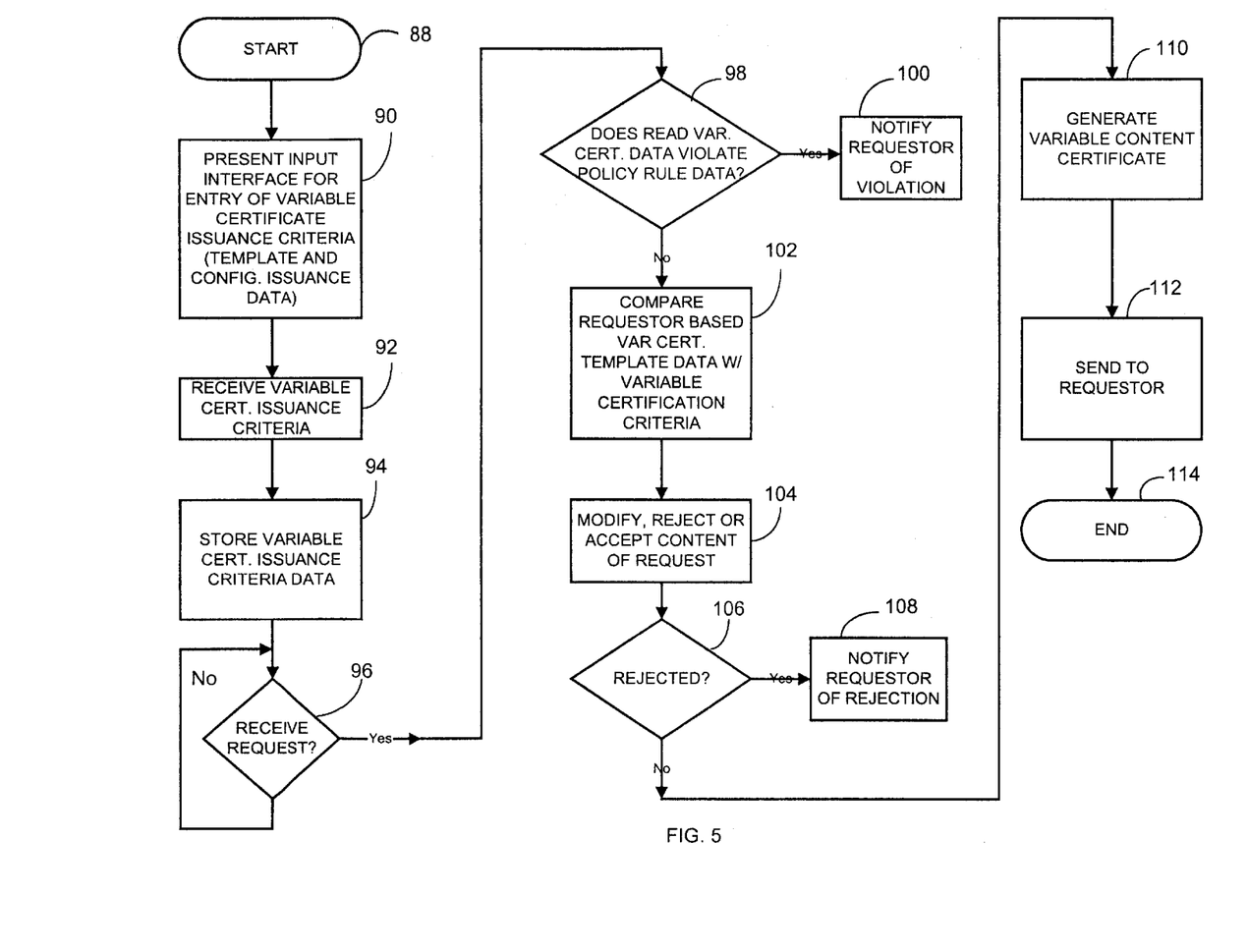
FIG. 5 is a flowchart generally depicting one example of the operation of a certificate issuing unit in accordance with one embodiment of the invention.

FIG. 5 is a flowchart generally showing the operation of the certificate issuing unit 18 where it is initialized as shown in block 88. As shown in block 90, after initialization of the certificate issuing unit 18, a graphical user interface is used to present a security officer (or other user) with an input interface for entry of the variable certificate issuance criteria data and constraint limit information such as configurable issuance criteria data 32. This is preferably accomplished by providing a series of application templates such as an electronic commerce application template, an E-mail template or other suitable application templates to allow entry of template data and configurable issuance criteria data on a per application basis. As shown in block 92, the certificate issuing unit 18 receives the variable certificate issuance criteria data and configurable issuance criteria data 32 and stores it in memory 34 in a variable certificate criteria database 34 as shown in block 94.

The certification issuing unit 18 after initialization then waits to see whether a variable certificate request has been received from a certificate management module 16 as shown in block 96. If a request has been received, the customizable certificate generator 36 analyzes the variable certificate content specification data as requested by the requestor and compares the received data to the data in template 80 to determine whether the received certificate contains template data that violates the rules associated with the variable certificate issuance criteria data and configurable issuance data 32. If the received template data violates rules associated with the issuance criteria data, the certificate issuing unit 18 generates a notification signal to the requestor via communication link 30 as shown in blocks 98 and 100. If the template data received from the certificate management module 16 does not violate rules corresponding to the variable certificate issuance criteria data and configurable issuance criteria data, the customizable certificate generator 36 compares the requestor based template data with the template data from template 80 of the certificate issuing unit as shown in block 102. Depending upon the comparison, the certificate issuing unit 18 either modifies the template data, rejects the variable certificate request or accepts the received content, namely the template data as shown in block 104.

If the certificate issuing unit 18 rejects the received template data, the certificate issuing unit 18 notifies the requester through the approval status command, through link 30 as shown in block 106 and 108. If no rejection is needed, the certificate issuing unit 18 then generates a variable content based certificate as shown in block 110 and sends the approved variable content based certificate to the requestor as shown in block 112. If a modification is necessary, a modification is automatically carried out by overwriting the undesired template data from template 40 based on template data 80 according to the configurable issuance criteria data. For example, The certificate issuing unit's operating policy may forbid it creating subscriber signature key pairs. If such a request were to be received, then it would be modified or rejected. The certificate issuing unit 18 then waits for a variable certificate request from a requestor, or information from a security officer to change the configurable issuance criteria or other parameter as shown in block 114.

Figure 6:
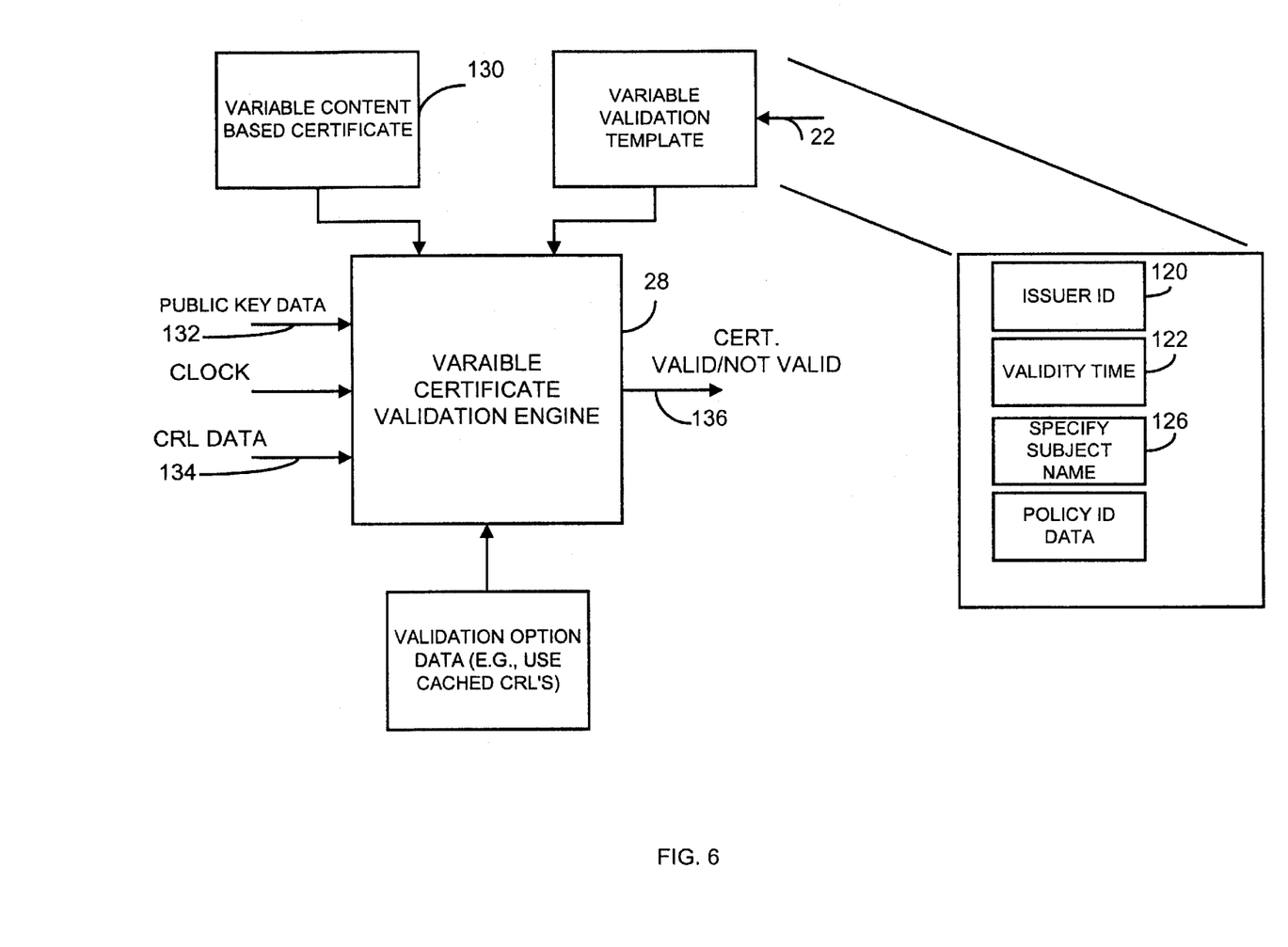
FIG. 6 is a block diagram generally showing validation of customized certificates in accordance with one embodiment of the invention.

FIG. 6 shows an example of validation of the issued customized certificate 130 by a relying party. Validation is based on the variable validation parameters 22 that may be entered in the same way that the selected certificate parameters 20 may be entered. Examples of variable validation parameters 22 include issuer I.D. data 120 which corresponds to identification data of a certificate issuing unit so that only certificates issued by a particular certification authority are validated by a given application if desired. Other variable validation parameters 22 include validity time data 122 indicating that certificate validity be verified for some time earlier than the present time. In addition, variable validation parameters 22 include policy I.D. data 124 and subject name data 126 so that certificates are only validated if they are in a list of acceptable policy ID's and if they come from a certain subject within the system. It will be recognized that other suitable variable validation parameters may also be used.

The variable certificate validation engine 28 uses the variable validation parameters 22 and analyzes a certificate 130 issued to another subscriber by the certificate issuing unit 18 or other certificate issuing unit and performs standard validation procedures as used in public key cryptography systems to determine whether or not the certificate is valid. For example the validity period in the certificate shall include the time for which an evaluation of the certificate validity is requested, and the appearance of the certificate in the certificate revocation list data shall be checked. An indication of whether the customized certificate is valid for that application is then generated as shown in block 136. Other validation techniques that may be used include the use of cached certificate revocation lists as described in co-pending application entitled "Computer Security Systems and Methods With On-Demand Publishing of Certificate Revocation Lists" filed in even date and assigned to the instant assignee.

It should be understood that the implementation of other variations and modifications of the invention in its various aspects will be apparent to those of ordinary skill in the art, and that the invention is not limited by the specific embodiments described. For example, the certificate issuing unit may be a another subscriber node. It is therefore contemplated to cover by the present invention, any and all modifications, variations, or equivalents that fall within the spirit and scope of the basic underlying principles disclosed and claimed wherein.

What is claimed is:

1. A security certificate management system for an information security system that employs a certificate requestor that requests a security certificate issued by a certificate issuing unit comprising:

means for providing selection of variable certificate content specification data for selection of content of a security certificate in response to a variable certificate issue request from the certificate requester; and means, operatively coupled to the means for providing, for issuing a variable content based certificate in response to selected variable certificate content specification data.

2. The certificate management system of claim 1 wherein the means for providing selection of variable certificate content specification data includes means for providing variable certificate validation of a certificate.

3. The certificate management system of claim 1 wherein the means for providing selection of variable certificate content specification data provides selection of certificate content for a plurality of application modules utilizing different certificate content specification data.

4. The certificate management system of claim 1 wherein the means for providing selection of variable certificate content specification data includes means for providing at least one variable certificate template to allow customization of security certificates issued by the means for issuing.

5. The certificate management system of claim 4 wherein the means for providing selection of variable certificate content specification data includes means, operatively coupled to the means for providing the variable certificate template, for requesting the variable content based certificate from the means for issuing.

6. The certificate management system of claim 4 wherein the means for providing selection of variable certificate content specification data is responsive to user selected certificate parameter data to customize certificates issued from the means for issuing.

7. The certificate management system of claim 4 wherein the means for providing selection of variable certificate content specification data transmits template data from the at least one variable certificate template to the means for issuing to facilitate customization of security certificates issued by the means for issuing.

8. The certificate management system of claim 1 wherein the means for issuing a variable content based certificate includes configurable means for analyzing the variable certificate content specification data to determine whether the variable content based certificate is in conformance with configurable issuance criteria data.

9. The certificate management system of claim 8 wherein the means for issuing a variable content based certificate further includes means for providing at least one variable certificate template based on the variable certificate content specification data and the configurable issuance criteria data.

10. The certificate management system of claim 9 wherein the means for providing at least one variable certificate template includes means for storing the configurable issuance criteria data.

11. A security certificate management system for an information security system that employs a requestor that requests a security certificate issued by a certificate issuing unit comprising:

means for providing selection of requestor based variable certificate content specification data for selection of content of a security certificate in response to a variable certificate issue request from the certificate requester, including means for providing at least one variable certificate template based on selected variable certificate content specification data; and means, operatively coupled to the means for providing, for issuing a variable content based security certificate in response to the selected variable certificate content specification data, wherein the means for issuing includes configurable means, operatively coupled to the means for providing, for analyzing the variable certificate content specification data to determine whether the variable content based security certificate is in conformance with configurable issuance criteria data.

12. The certificate management system of claim 11 wherein the means for providing selection of variable certificate content specification data includes means, operatively coupled to the means for providing the variable certificate template, for requesting the variable content based certificate from the means for issuing.

13. The certificate management system of claim 12 wherein the means for providing selection of variable certificate content specification data is responsive to user selected certificate parameter data to customize certificates issued from the means for issuing.

14. The certificate management system of claim 11 wherein the means for providing selection of variable certificate content specification data includes means for providing variable certificate validation of a certificate.

15. The certificate management system of claim 11 wherein the means for issuing a variable content based certificate further includes means for providing at least one variable certificate template based on the variable certificate content specification data and the configurable issuance criteria data.

16. The certificate management system of claim 11 wherein the means for providing selection of variable certificate content specification data facilitates selection of certificate content for a plurality of application modules utilizing different certificate content specification data.

17. The certificate management system of claim 11 wherein the means for facilitating variable certificate content specification data transmits template data from the at least one variable certificate template to the means for issuing to facilitate customization of security certificates issued by the means for issuing.

18. A security certificate management method for an information security system that employs a requestor that requests a security certificate issued by a certificate issuing unit comprising the steps of:

providing selection of variable certificate content specification data for selection of content of a security certificate in response to a variable certificate issue request from the certificate requester; and issuing a variable content based certificate in response to the requestor based variable certificate content specification data.

19. The certificate management method of claim 18 wherein facilitating variable certificate content specification data includes providing variable certificate validation of a certificate.

20. The certificate management method of claim 18 wherein providing selection of variable certificate content specification data includes facilitating selection of certificate content for a plurality of application modules utilizing different certificate content specification data.

21. The certificate management method of claim 18 wherein facilitating variable certificate content specification data includes providing at least one variable certificate template to facilitate customization of issued security certificates.

22. The certificate management method of claim 21 wherein facilitating variable certificate content specification data includes requesting the variable content based certificate from a certificate issuing unit.

23. The certificate management method of claim 21 wherein facilitating variable certificate content specification data includes customizing certificates issued from a certificate issuing unit based on user selected certificate parameter data.

24. The certificate management method of claim 21 where providing selection of variable certificate content specification data includes transmitting template data from the at least one variable certificate template to a certificate issuing unit to facilitate customization of security certificates issued by the certificate issuing unit.

25. The certificate management method of claim 18 wherein issuing a variable content based certificate includes analyzing the variable certificate content specification data to determine whether the variable content based certificate is in conformance with configurable issuance criteria data.

26. The certificate management method of claim 25 wherein issuing a variable content based certificate further includes providing at least one variable certificate template based on the variable certificate content specification data and the configurable issuance criteria data.

27. The certificate management method of claim 26 wherein the step of providing at least one variable certificate template includes storing the configurable issuance criteria data for access by a certificate issuing unit.

28. A security certificate management method for an information security system that employs a certificate requester that requests a security certificate issued by a certificate issuing unit comprising the steps of:
providing selection of variable certificate content specification data for selection of content of a security certificate in response to a variable certificate issue request from the certificate requester including providing at least one variable certificate template based on selected variable certificate content specification data, to facilitate customization of issued security certificates by the certificate issuing unit; and
issuing a variable content based security certificate in response to the selected variable certificate content specification data, wherein the step of issuing includes analyzing the selected variable certificate content specification data to determine whether the variable content based security certificate is in conformance with configurable issuance criteria data.

29. The certificate management method of claim 28 wherein providing selection of variable certificate content specification data includes requesting the variable content based certificate from a certificate issuing unit.

30. The certificate management method of claim 29 wherein providing selection of variable certificate content specification data includes customizing certificates issued from a certificate issuing unit based on user selected certificate parameter data.

31. The certificate management method of claim 28 wherein providing selection of variable certificate content specification data includes providing variable certificate validation of a certificate.

32. The certificate management method of claim 28 wherein issuing a variable content based certificate further includes providing at least one variable certificate template based on the variable certificate content specification data and the configurable issuance criteria data.

33. The certificate management method of claim 28 wherein providing selection of variable certificate content specification data includes facilitating selection of certificate content for a plurality of application modules utilizing different certificate content specification data.

34. The certificate management method of claim 28 wherein providing selection of variable certificate content specification data includes transmitting template data from the at least one variable certificate template to a certificate issuing unit to facilitate customization of security certificates issued by the certificate issuing unit.

35. A storage medium for storing programming instructions, when read by a processing unit, causes the processing unit to perform variable content based certificate processing, the storage medium comprising:
first means for storing programming instructions that when read by the processing unit, causes the processing unit to provide variable certificate content specification data for selection of content of a security certificate in response to a variable certificate issue request from a certificate requestor; and
second means for storing programming instructions that when read by the processing unit, causes the processing unit to issue a variable content based certificate in response to selected variable certificate content specification data.

36. The storage medium of claim 35 wherein the second means for storing programming instructions stores programming instructions that, when read by a processing unit, causes the processing unit to facilitates analyzing the variable certificate content specification data to determine whether the variable content based certificate is in conformance with configurable issuance criteria data.

37. The storage medium of claim 35 wherein the first means for storing programming instructions stores programming instructions that, when read by a processing unit, causes the processing unit to facilitates providing at least one variable certificate template to facilitate customization of security certificates issued by a certificate issuing unit.

38. The storage medium of claim 37 wherein the first means for storing programming instructions stores programming instructions that, when read by a processing unit, causes the processing unit to facilitate requesting the variable content based certificate from the certificate issuing unit.

* * * * *

UNITED STATES PATENT AND TRADEMARK OFFICE
CERTIFICATE OF CORRECTION

PATENT NO.    : 6,108,788
DATED         : August 22, 2000
INVENTOR(S)   : Moses et al.

It is certified that error appears in the above-identified patent and that said Letters Patent is hereby corrected as shown below:

Column 4,
Line 53, before "includes," delete "1 8" and insert -- 18 --

Column 6,
Line 59, before "72," delete "block" and insert -- blocks --

Column 9,
Line 17, before "and," delete "requester" and insert -- requestor --

Column 10,
Line 5, before "variable," delete "requestor based"
Line 60, before "and," delete "requester" and insert -- requestor --
Line 65, before "variable," delete "facilitating" and insert -- providing selection of --

Column 11,
Lines 7, 12 and 16, before "variable," delete "facilitating" and insert -- providing selection of --

Column 12,
Line 44, before "analyzing," delete "facilitates" and insert -- facilitate --
Line 51, before "providing," delete "facilitates" and insert -- facilitate --

Signed and Sealed this

Twenty-third Day of September, 2003

JAMES E. ROGAN
*Director of the United States Patent and Trademark Office*